(12) United States Patent
Parr et al.

(10) Patent No.: US 12,450,656 B2
(45) Date of Patent: Oct. 21, 2025

(54) SYSTEM AND METHOD FOR IMPLEMENTING AND OPERATING AN ENTERPRISE DATA ASSET MARKETPLACE WITH DATA AND ANALYTICS PRODUCT LIFECYCLE MANAGEMENT

(71) Applicant: KPMG LLP, New York, NY (US)

(72) Inventors: Bob Parr, Charlotte, NC (US); Robert C. Moroney, Denver, CO (US); Gabriel Crane, New York, NY (US); Justin Oleksy, Virginia Beach, VA (US)

(73) Assignee: KPMG LLP, New York, NY (US)

( * ) Notice: Subject to any disclaimer, the term of this patent is extended or adjusted under 35 U.S.C. 154(b) by 244 days.

(21) Appl. No.: 18/238,260

(22) Filed: Aug. 25, 2023

(65) Prior Publication Data
US 2025/0069137 A1    Feb. 27, 2025

(51) Int. Cl.
*G06Q 40/04*    (2012.01)
(52) U.S. Cl.
CPC .................................. *G06Q 40/04* (2013.01)

(58) Field of Classification Search
CPC ...................................................... G06Q 40/04
See application file for complete search history.

(56) References Cited

U.S. PATENT DOCUMENTS 10,366,250 B1 * 7/2019 Chen ................... G06F 21/6245
12,153,704 B2 * 11/2024 Patel ..................... H04L 63/102

FOREIGN PATENT DOCUMENTS

WO    WO-2020248149 A1 * 12/2020 ......... G06F 21/6254

\* cited by examiner

*Primary Examiner* — Scott S Trotter
(74) *Attorney, Agent, or Firm* — HUNTON ANDREWS KURTH LLP

(57) ABSTRACT

The invention relates to computer-implemented systems and methods that implements a data asset marketplace and management platform. An embodiment of the present invention is directed to a cloud-based data and analytics (D&A) platform enabling professionals and various users with accelerated access to critical data, D&A tools and workspaces to create and deliver reusable data-driven solutions.

20 Claims, 12 Drawing Sheets

SYSTEM AND METHOD FOR IMPLEMENTING AND OPERATING AN ENTERPRISE DATA ASSET MARKETPLACE WITH DATA AND ANALYTICS PRODUCT LIFECYCLE MANAGEMENT

FIELD OF THE INVENTION

The present invention relates to systems and methods for providing a data asset marketplace and management platform.

BACKGROUND

Third party assets that are publicly available continue to increase and grow. However, organizations struggle with the speed of growth and ability to manage control of assets. For example, data access is inconsistent, laborious and time consuming while data ingestion and preparation is overly complicated and tedious. Currently, data from various sources are acquired in a distributed manner where data access is manual, disjointed and misaligned with client delivery expectations. This leads to inefficiencies related to copying and replicating data and struggles with maintaining control over protected and sensitive data. As data continues to grow, compliance with regulations and policies become increasing more difficult and complicated to manage and ensure.

It would be desirable, therefore, to have a system and method that could overcome the foregoing disadvantages of known systems.

SUMMARY

According to one embodiment, the invention relates to a computer-implemented system for implementing a data asset marketplace. The system comprises: a data exchange interface that is configured to receive data assets from a plurality of data sources, wherein the plurality of data sources comprise at least one external source and at least one third party source; a data asset storage component that stores and manages the data assets and one or more data analytics; and a data asset marketplace that comprises a user interface that enables a user identified by a persona profile to access the data asset marketplace, wherein the data asset marketplace comprises a computer processor coupled to the user interface and the data asset storage component and the computer processor is configured to perform the steps of: enabling the user to discover and select data assets and analytics available through the data asset marketplace via a data virtualization layer; setting up a cloud data and analytics workspace for a specific project wherein the cloud data and analytics workspace comprises a data handling profile and one or more designated team members; enabling the user to check-out the selected data assets and analytics; enabling the user to build through the cloud data and analytics workspace to generate an output; based on one or more data protection policies, identifying whether the output comprises sensitive data; when sensitive data is detected, applying protected views to the sensitive data; and enabling the user to share and deliver the output with the one or more protected views to one or more recipients.

According to another embodiment, the invention relates to a computer-implemented method for implementing a data asset marketplace. The method comprises the steps of: receiving, via a data exchange interface, data assets from a plurality of data sources, wherein the plurality of data sources comprise at least one external source and at least one third party source; storing and managing, via a data asset storage component, the data assets and one or more data analytics; enabling, via a user interface, a user to discover and select data assets and analytics available through the data asset marketplace via a data virtualization layer, wherein the user is identified by a persona profile; setting up a cloud data and analytics workspace for a specific project wherein the cloud data and analytics workspace comprises a data handling profile and one or more designated team members; enabling the user to check-out the selected data assets and analytics; enabling the user to build through the cloud data and analytics workspace to generate an output; based on one or more data protection policies, identifying whether the output comprises sensitive data; when sensitive data is detected, applying protected views to the sensitive data; and enabling the user to share and deliver the output with the one or more protected views to one or more recipients.

An embodiment of the present invention is directed to a system and method that implements a cloud-based data and analytics (D&A) platform enabling professionals and various users with accelerated access to critical data, D&A tools and workspaces to create and deliver reusable data-driven solutions.

According to an embodiment of the present invention, a data asset marketplace enables various users to identify relevant datasets that can be accessed and worked on in a cloud-based workspace environment. The data asset marketplace supports various users as well as different flows and requirements. For example, a user may interact with the Marketplace by identifying assets (through various interactions such as a drag and drop action) in a shopping cart. At checkout, the user may engage in a process that identifies what controls to apply. This may involve interactions with the user through questions about workspace, data uses, end user, etc. The controls may be applied to ensure compliance with regulations, policies, etc.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION

Exemplary embodiments of the invention will now be described in order to illustrate various features of the invention. The embodiments described herein are not intended to be limiting as to the scope of the invention, but rather are intended to provide examples of the components, use, and operation of the invention.

An embodiment of the present invention is directed to a cloud-based data and analytics (D&A) platform enabling professionals and various users with accelerated access to critical data, D&A tools and workspaces to create and deliver reusable data-driven solutions.

An embodiment of the present invention is directed to sourcing data from a broader market into a common platform and then tagging the data with appropriate controls relating to how the data can be used, who can access the data and/or other conditions and restrictions.

The innovative platform may include a marketplace that enables various users to search and identify relevant data assets and analytics. Various types of users may access the marketplace as represented by Persona Profiles, such as consumers, users and coders. For example, consumers may represent consumers of D&A products; users may represents users of basic D&A engineering and visualization tools and coders may represents advanced users such as engineers, data scientists, etc. Personal Profiles may support business practitioners with limited or no data and analytics skills, practitioners with business intelligence ("BI") level skillsets, advanced data science, and modeling and engineering professionals. Other persona profiles and variations thereof may be supported.

Figure 1:
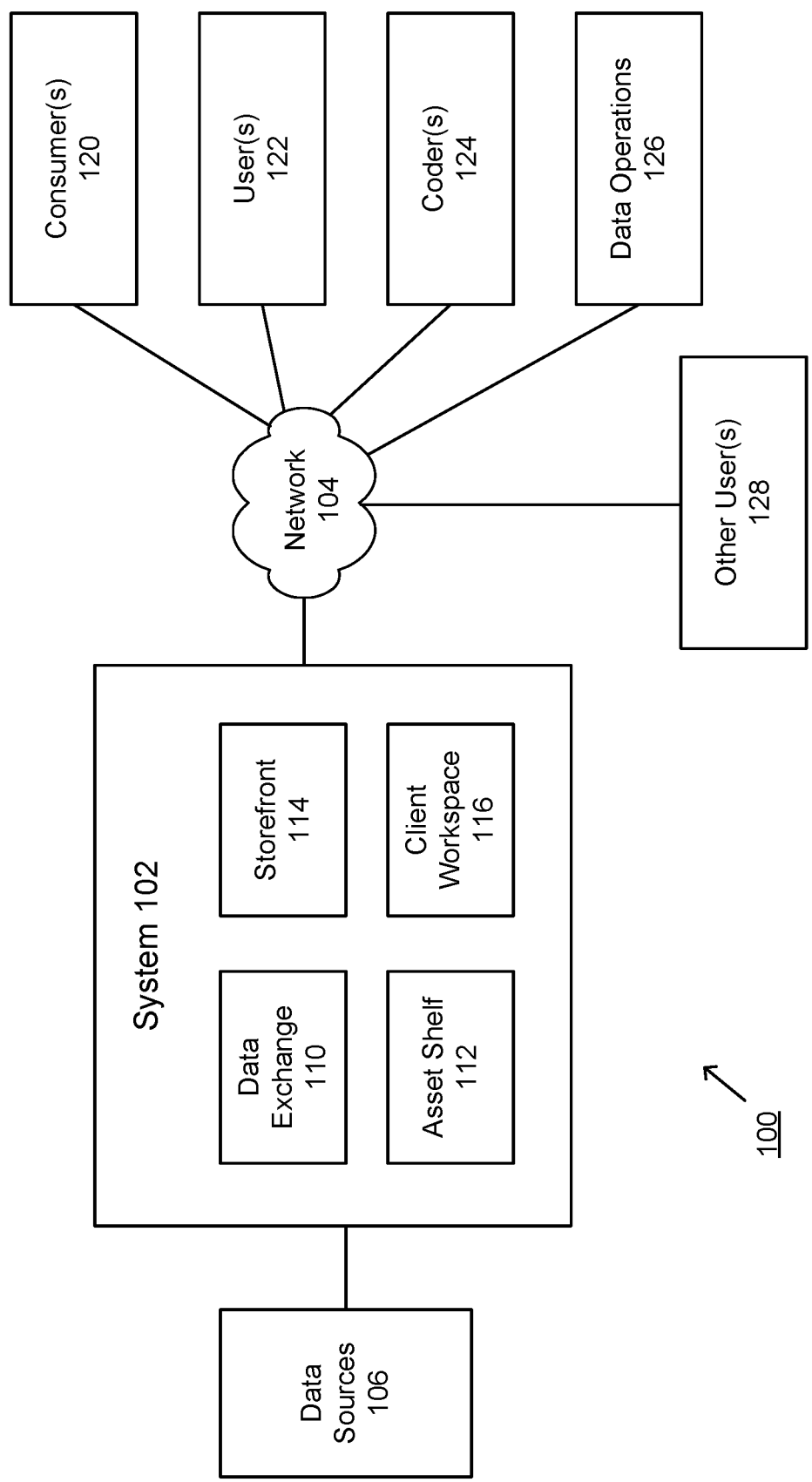
FIG. 1 is an exemplary flow diagram, according to an embodiment of the present invention.

FIG. 1 illustrates an exemplary system, according to an embodiment of the present invention. System 102 may support various features and functions represented by Data Exchange 110, Asset Shelf 112, Storefront 114, and Client Workspace 116.

Data Exchange 110 provides simplified, expanded data asset sourcing and ingestion. For example, Data Exchange 110 may provide access to various sources of data, represented by Data Sources 106. Data may include market data services, consolidated data sources, subscription data, research data, etc. Data Sources 106 may represent third party data sources, external data sources, internal data sources, etc.

Asset Shelf 112 provides centralized asset management, storage and maintenance. This supports an authoritative, single source of truth, governed data assets and managed D&A use cases. Asset Shelf 112 enables access to data assets to conduct data analytics, data visualization and data science. In addition, data may be secured and protected through masking, encryption, tokenization, & table, column, schema, field level security, etc.

Storefront 114 provides a self-service interface for data search and selection. This feature provides self-service data discovery, permissible data usage and usage measurement and reporting. For example, a Self-Service Access may support features such as browse, explore, interrogate and provision third party, internal, harvested client data sets in a self-service catalog. Storefront 114 provides an online shopping experience for data assets. For example, a "check-out" of data may establish a direct connection between Client Workspace 116 with data assets. Accordingly, data does not need to be moved or replicated.

Client Workspace 116 provides a cloud, desktop-like workspace to create and collaborate on data and analytics. This may include support for Cloud-based Analytics, which enables the ability to access data sets and create, maintain, collaborate on analytics solutions in a protected cloud environment. Client Workspace 116 provides a work area for consumers, users, coders, data operations professionals, etc. Based on data manipulations, curations, transformations, visualizations and other outputs created, an embodiment of the present invention stores views of the data instead of duplicating full data sets.

Other features may provide: access to pre-built solutions, such as benchmarks, visualizations, dashboards around priority firm market investments for use or re-purposing. An embodiment of the present invention provides Scalable Compute and Tooling which enables building solutions in cloud-based environment with compute and tools aligned to advance analytics, machine learning (ML), artificial intelligence (AI), etc.

Other platform capabilities may include: Priority Data Sets Onboarded to cloud storage; Front End Portal for Data Asset Discovery, use cases, and pre-built D&A solutions; Automated Digital Workspace provisioning with single sign-on; Virtualization, Data Protection, and Governance of data at-rest and in-motion; Marketplace for data shopping and provisioning; Data policy validation and attestation for permissible use; Data operations and engineering factory for data ingest, data quality, and profile maintenance as well as end-to-end install, configuration, and data integration between various providers, such as cloud native Snowflake, Informatica IICS, Denodo, Protegrity, MS PowerBI, Dataiku, MS Office Suite, MS Azure, etc.

An embodiment of the present invention may support various user types including Consumer 120, User 122, Coder(s) 124 and Data Operations 126. Other users may be supported as shown by 128.

Consumers 120 may include executives who generally search, browse and/or explore ready to use D&A analytic solutions providing insights on variety of topics that require performance assessments, visualizations, dashboards, summary reports. Consumers of the analytics may explore reusable, completed solutions in native form; navigate (in seconds) via link to an internal portal; extract solutions and engage data services.

For example, a consumer may represent a user that accesses the marketplace to address a specific problem or question, such as what are the benchmarks associated with an industry. In this example, the consumer may access a portal tailored to a specific industry which enables the user to then apply access insights in response to a need for insights as quickly as possible.

Users 122 may include client facing managers. For example, users may search, browse, explore, research, and/or interrogate data sets (e.g., public, paid, internal, etc.); access and prepare data for various uses; including modeling and visualization, address data quality issues, etc. In addition, users may browse a catalog of data assets that may be accessed quickly in a workspace; explore associated analytic use cases that may serve as a starting point; self-service move data to a workspace and build a benchmark using tools and update the benchmark as needed using client feedback and share with a client.

For example, a user may seek to modify or work from existing analytics. The user may find data on the platform and then move the data to a cloud data analytics workspace. From there, the user may build and/or revise analytics, such as benchmark data, by clicking through various tools and applications to build business level analytics.

Coder(s) 124 may include data scientists and other sophisticated/advanced users. Coder(s) may bring many data sets together for complex model development, execute advanced querying, scripting and analytical techniques. For example, coders may self-service access a workspace with advanced tools for modeling, AI, ML, advanced analytics workflows; pull new environmental social and governance (ESG) data as needed from the marketplace to curate a model; and import permissible client data to blend with, train and/or improve the model.

For example, a coder may represent a user who innovates using raw datasets as well as generates new analytics. Also, the coder may use advanced capabilities and AI/ML to build out complex workflows and models, retune forecasts and generate predictive analytics.

Data Operations 126 may include data engineers who access raw data sets, evaluate data quality, remediate and curate for use; prepare, profile, append policy-as-code tagging and land in marketplace for end-user access and provisioning.

According to an exemplary illustration, a business need may involve a client seeking to gain an understanding of the degree to which their asset portfolios are exposed to climate related issues. The user may address key risk across physical assets and also supply chain and financial services portfolios.

An embodiment of the present invention may leverage self-service analytics to aid users in their knowledge growth across a range of environmental, social and governance (ESG) related service offerings.

According to an exemplary illustration, data may be transformed into repeatable insights. For example, third party ESG data may be transformed into proprietary analytics enabling various users from Advisory, Tax and Audit with self-service, real-time and repeatable ESG and sustainability insights to create business value with D&A. In this example the value was in the form of go-to-market (GTM) client value. Data Asset inputs may include a wide variety of data assets modelled together, supplemented with knowledge to create proprietary insights and value. User friendly interfaces and self-service analytics provide on-demand ESG insights, such as data analytics (e.g., industry, peer gap analyses, benchmarking, etc.); go-to-market (e.g., ready-to-use, repeatable analytics to accelerate GTM activities and enhance presentations, etc.); ESG knowledge (e.g., repository of sustainability frameworks and ESG vendor data dictionaries to upskill practitioners); and tools and technology (e.g., registry to tools across ESG pillars for self-service access). Uses cases may include peer benchmarking, industry specific topics, disclosure analysis, ESG assurance analysis, predictive analysis, Tax key performance indicator (KPI) analysis, ESG metrics translator, etc. Other applications, use cases and scenarios may be supported.

An embodiment of the present invention may include an auto-harvesting feature that automatically harvests assets from various sources. This may also include an auto-intelligent usage tracking and analysis of datasets and solutions. An embodiment of the present invention may use various capabilities and operating models to proactively populate profiles of potential data investments and new datasets to the platform to discover and expose these assets. An embodiment of the present invention may intelligently apply and generate a taxonomy/ontology around the data. This may be applied to enhance asset search capabilities.

Users may communicate with System 102 via Network 104. System 102 may communicate and integrate with other devices and support various configurations and architectures. System 102 may support interactions on devices including mobile or computing device, such as a laptop computer, a personal digital assistant, a smartphone, a smartwatch, smart glasses, other wearables or other computing devices capable of sending or receiving network signals. System 102 may include computer components such as computer processors, microprocessors and interfaces to support applications including browsers, mobile interfaces, dashboards, interactive interfaces, etc. Other functions and features represented may be supported in various forms and implementations. While FIG. 1 illustrates individual devices or components, it should be appreciated that there may be several of such devices to carry out the various exemplary embodiments.

System 102 may be communicatively coupled to various data sources including any suitable data structure to maintain the information and allow access and retrieval of the information. Data Sources 106 may be local, remote, cloud or network based. Communications with Data Sources 106 may be over a network, or communications may involve a direct connection.

Networks may be a wireless network, a wired network or any combination of wireless network and wired network. Although Network 104 is depicted as one network for simplicity, it should be appreciated that according to one or more embodiments, Network 104 may comprise a plurality of interconnected networks, such as, for example, a service provider network, the Internet, a cellular network, corporate networks, or even home networks, or any of the types of networks mentioned above. Data may be transmitted and received via Network 104 utilizing a standard networking protocol or a standard telecommunications protocol.

The system 100 of FIG. 1 may be implemented in a variety of ways. Architecture within system 100 may be implemented as hardware components (e.g., module) within one or more network elements. It should also be appreciated that architecture within system 100 may be implemented in computer executable software (e.g., on a tangible, non-transitory computer-readable medium) located within one or more network elements. Module functionality of architecture within system 100 may be located on a single device or distributed across a plurality of devices including one or more centralized servers and one or more mobile units or end user devices. The architecture depicted in system 100 is meant to be exemplary and non-limiting. For example, while connections and relationships between the elements of system 100 are depicted, it should be appreciated that other connections and relationships are possible. The system 100 described below may be used to implement the various methods herein, by way of example. Various elements of the system 100 may be referenced in explaining the exemplary methods described herein.

Figure 2:
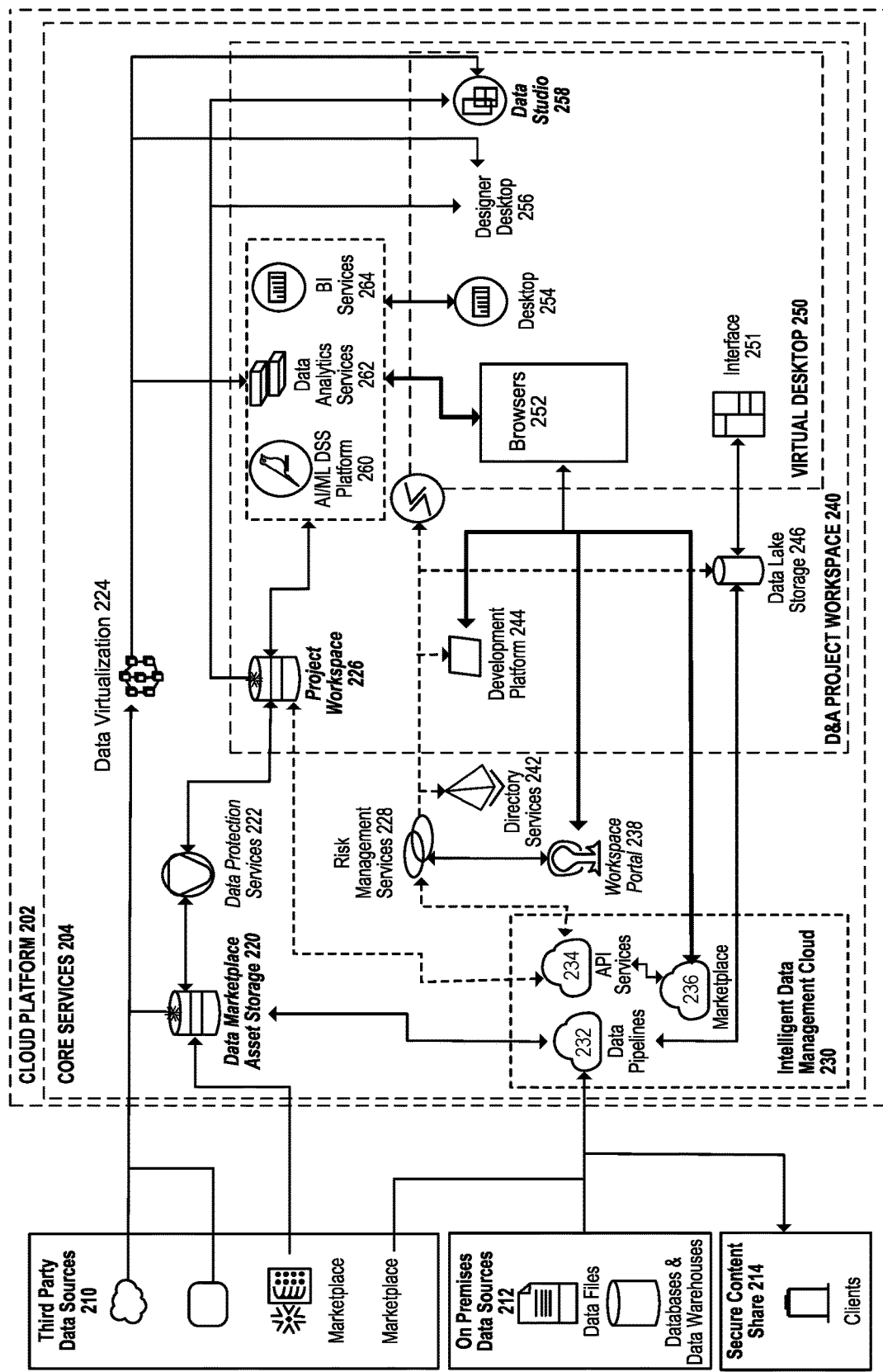
FIG. 2 is an exemplary architecture, according to an embodiment of the present invention.

FIG. 2 is an exemplary architecture, according to an embodiment of the present invention. The architecture shown in FIG. 2 may support various forms of data sources including Third Party Data Sources 210, On Premise Data Sources 212 and Secure Content Share 214. Secure Content Share 214 supports secure file sharing between clients and projected teams.

Data may include raw data, e.g., public data, purchased/subscription based data, ESG related, etc. Curated data may include permissible internal data as well as externally sourced data, such as public sources, paid sources, data exchange acquired data, third party research engines, data acquisition pipelines, etc. D&A Solutions may include industry analytic tiles, benchmarks, ESG insights, reusable insights and solutions.

An embodiment of the present invention is directed to an intelligent orchestration engine that brings a combination of tools together and provides the ability to provision and enable access to data in a workspace/virtual desktop in a manner that is automated (without human interaction to progress a workflow), governed by policy terms and/or conditions, protected and allows users to access data in an on-demand manner.

Core Services 204 may be supported within a Cloud Platform 202. Core Services 204 may provide automated marketplace data asset provisioning, centralized data policy enforcement and seamless data integration with tools. Components to support Cores Services may include Data Marketplace Asset Storage 220, Data Protection Services 222, Data Virtualization 224, Intelligent Data Management Cloud 230, D&A Project Workspace 240 and Virtual Desktop 250.

Data Marketplace Asset Storage 220 provides rapid access to real-time data sources, such as Third Party Data Sources 210, On Premises Data Sources 212 and Secure Content Share 214. In addition, new data assets may be added from marketplaces, as shown by 210. Data Marketplace Asset Storage 220 may represent a cloud based warehousing tool that stores datasets and enables users access to the datasets from multiple different sources without having to move the data thereby eliminating the need replicate data and require version controls. Data Marketplace Asset Storage 220 provides a cloud-based data sourcing exchange (e.g., catalog of ingestible data sets) and data warehousing solution enabling a consolidation of data discovery, access and related analytics into a single source of truth. The single source of truth establishes views into data from each application rather than duplicating and moving data. Data Marketplace Asset Storage 220 also provides instant access to a data marketplace, represented by Marketplace 236 where users may share and collaborate on live data.

An embodiment of the present invention provides the ability to facilitate deployment of datasets to a client and/or project workspace in a secure manner with controls that may be specific to key members. The datasets have certain associated attributes to reinforce those controls. The innovative marketplace facilitates and expedites deployment in a controlled way and further simplifies/streamlines the ingestion of new datasets. Various users with different goals and needs may interact with the marketplace to view and access data, including exposure to metadata to help establish a contextual understanding of the data assets for application and business needs, e.g., business oriented description of the data, linked analytic use cases that leverage the data.

Data Protection Services 222 may secure and protect data through various techniques including anonymization, masking, encryption, tokenization, etc. As shown in FIG. 2, Data Protection Services 222 may provide data in its protected form to Project Workspaces 226. For example, Data Protection Services 222 may represent a data protection tokenization service that evaluates data against a set of governance protocols, rules and configurations. Data Protection Services 222 enables automated, policy-driven tokenization, masking, encryption and anonymizing across various data sources and further enables automated policy-driven viewing of protected data via active directory roles, properties and attributes, represented by 242. The data protection tokenization service may tag or cross reference data to identify what data may be exposed to certain users. An embodiment of the present invention may make inferences based on comparison of rules and tags. For example, sensitive data may include social security numbers (SSN). The nature of an end user's role and intended purpose (which may be identified through user responses to targeted questions) may be analyzed prior to making data available. For users that cannot access SSN, that data may be removed, anonymized, tokenized and/or otherwise sanitized. With an embodiment of the present invention, data may be exposed, provisioned to a workspace where rules and protocols may be applied to properly handle sensitive and/or protected data.

Data Virtualization 224 may connect various types of data sources and combine relevant information into views and outputs. Virtualization of data sets avoids having to move data and/or copy large datasets. Data Virtualization 224 provides an interface to data across different locations and sources and further renders data from multiple locations into a single workspace. Data Virtualization 224 provides a data virtualization layer between data authoritative source of truth and the interfaces and applications consuming that data, integrating data siloed across functional and enterprise repositories, regardless of data format, size, location or latency. Users may access external and internal data sources in a consistent and centralized manner regardless of where the data is physically stored and without replication of the data. Data Virtualization 224 further provides centralized and consistent enforcement of highly configurable and granular data access and governance policies across all data sources.

Intelligent Data Management Cloud 230 may support data governance capabilities. For example, Intelligent Data Management Cloud 230 may represent a cloud suite marketplace that supports data governance over third party and internal data sources; cataloging of data sets including metadata and data asset contextual information; automated data quality management, remediation and quality scoring; and management of data flow, data lineage and usage tracking between data exchange/repositories and downstream storefront and D&A workflow applications. Data Pipelines 232 may support automated import of new and/or updated data assets to the Data Marketplace as well as automated file exchanges with Data Lake Storage 246. API Services 234 may support project warehouse data provisioning through Project Workspaces 226. API Services 234 also supports data marketplace and data workspace capabilities. API Services 234 may support Risk Management Services 228. Marketplace 236 may be accessed through browsers 252 executing on a virtual desktop, as shown by 250. Browser 252 may also support other services including Development Platform 244 and Workspace Portal 238. Development Platform 244 may support project knowledge management, source control and continuous integration/continuous delivery (CICD) capabilities. Directory Services 242 may represent a database and services that connect users. Workspace Portal 238 may manage project workspaces experiences.

D&A Project Workspace 240 may support Data Lake Storage 246, Project Workspace Services 226 and Development Platform 244. Other services may include AI/ML Decision Support System Platform 260, Data Analytics Services 262 and Business Intelligence (BI) Services 264. An embodiment of the present invention provides a skill agnostic platform that allows users at varying levels to guild and execute robust analytical and AI/ML driven activities at scale.

Virtual Desktop 250 provides a work area for analysts, engineers, scientists and/or other users. As shown in FIG. 2, Virtual Desktop 250 may support Interface 251, Browsers 252, Desktop 254, Designer Desktop 256, Data Studio 258 and other applications. For example, Data Studio 258 may provide data management and modeling integrated development environment (IDE).

An embodiment of the present invention is directed to a Marketplace 236 that exposes various users to datasets by allowing users to browse data and solutions without having to commit to a cloud environment to begin working on the data. With current systems, users are being charged each time data is provisioned and analysis is performed on the data. By exposing the assets through a low or no cost portal-based storefront, users may discover and interact with data profiles to confirm fit-for-purpose use before provisioning the data to a workspace where cloud-based compute charges would be incurred.

Figure 3:
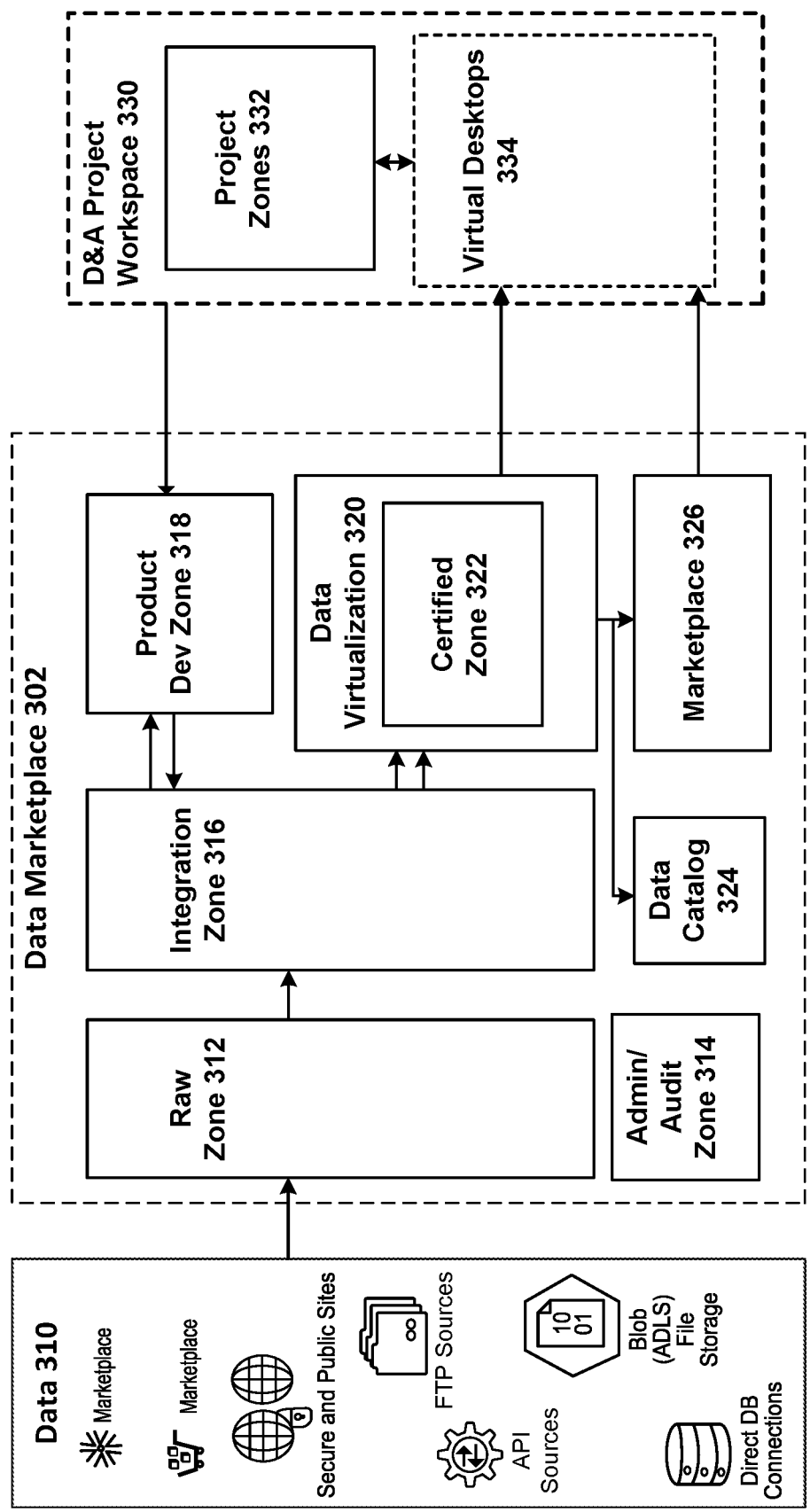
FIG. 3 is an exemplary workflow, according to an embodiment of the present invention.

FIG. 3 is an exemplary workflow, according to an embodiment of the present invention. Data 310 from various data sources may feed into Data Marketplace 302. Data sources may include marketplaces, secure and public sites, File Transfer Protocol (FTP) sources, API sources, file storage, direct database (DB) connections, etc. Data Marketplace 302 may support various zones including Raw Zone 312, Integration Zone 316, Administration/Audit Zone 314, Product Development Zone 318, Data Virtualization 320 and Certified Zone 322, Data Catalog 324 and Data Marketplace 326. D&A Project Workspace 330 may support Project Zones 332 and Virtual Desktops 334.

Raw data from data sources may be received by Data Marketplace 302 through Raw Zone 312. The quality of the data, including incomplete or missing fields, are improved, remediated, and/or cleansed and rules may be executed against the data to prepare the dataset for consumption in the Integration Zone 316. Checks on data quality and lineage may be applied at the Admin/Audit Zone 314. Data manipulations, joins, transformations, and/or other data preparation activities may then be executed to improve the nature of the data for business consumption by introducing new business contextual terms or taxonomy/ontologies to ensure applicability for professional consumption in the Product Development Zone 318. Various users may create and access D&A Project Workspaces 330. Data exploration and development may be supported by Virtual Desktops 334. Data Access may be supported by Certified Zone 322 and Data Virtualization 320. Quality data may be managed, monitored, and maintenance with Certified Zone 322. Data discovery and access management may be available when data is retrieved from Data Catalog 324 and/or Marketplace 326.

According to an embodiment of the present invention, Marketplace 326 enables various users to identify relevant datasets that can be accessed and worked on in a workspace environment. Marketplace 326 supports various users, including engagement with different flows and requirements.

An embodiment of the present invention may be directed to enabling users to search for and locate assets (e.g., data assets, analytics, etc.) in a Marketplace. For example, a user may interact with the Marketplace by identifying assets (through various interactions such as a drag and drop action) in a shopping cart. During a checkout process, the user may engage in a process that identifies what controls to apply. This may involve interactions with the user through questions about workspace, data uses, end user, etc. The controls may be applied to ensure compliance with regulations, policies, etc.

Datasets may represent frequently used internal data extracted from source systems as well as third party data that has been purchased/licensed. Datasets may have associated restrictions driven either through contractual agreements or firm policy. For example, some datasets may be required to only be used in a derivative fashion (where raw data cannot be exposed but transformed data may be used and delivered to a client or other recipient).

An embodiment of the present invention may identify contractual language to be translated to business terminology which may then be used to generate a set of questions relating to how data may be accessed, e.g., personal identifiable information (PII) data must be expunged.

An embodiment of the present invention is directed to capturing insights, feedback and usage information and then translating this information into learnings and feature improvement for additional tagging and identifying additional datasets.

According to an exemplary illustration and implementation, a user may access the marketplace to discover assets. The user may then create a project workspace. In response, the system may interact with the user with a series of questions that may relate to team members, data use, whether the data will be shared internally, externally, client facing, etc. The questions may relate to how the data may be provisioned. The system may then generate a link that may be used to access the workspace. While in the workspace, the user may view data that is entered in a shopping cart. When the user is ready, a checkout process may be initiated. The user may view data details, including quality of datasets, terms and conditions, etc. Upon checkout, the data may appear in the project workspace.

Figure 4:
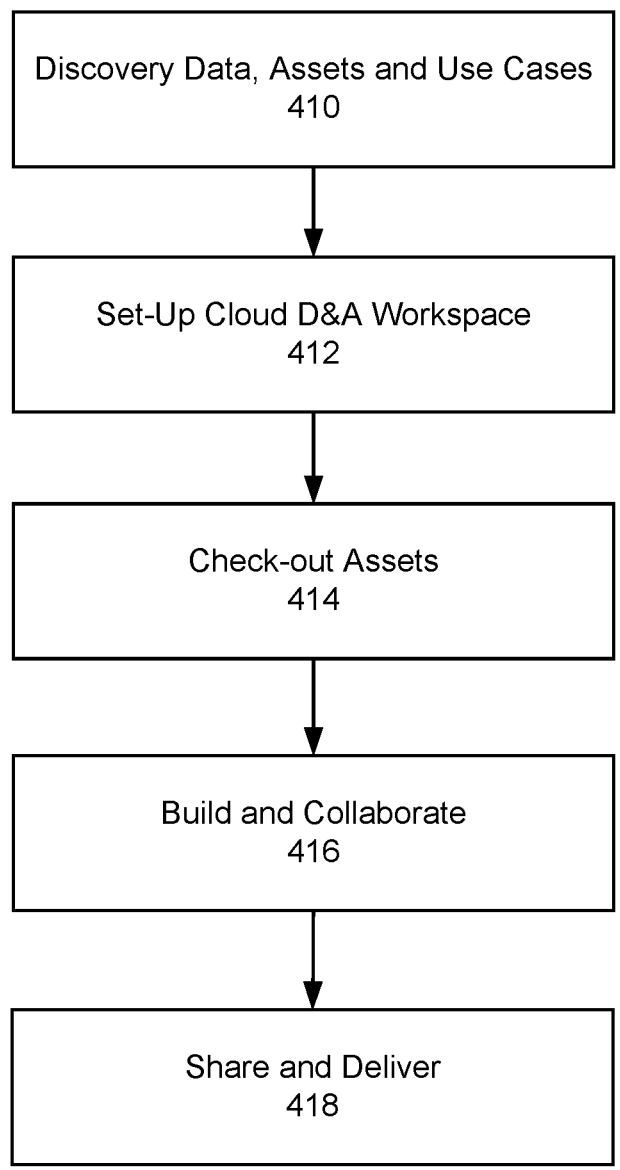
FIG. 4 is an exemplary flow diagram, according to an embodiment of the present invention.

FIG. 4 is an exemplary flow diagram, according to an embodiment of the present invention. At step 410, assets may be discovered. At step 412, a workspace may be created. At step 414, assets may be checked-out. At step 416, a user may build and collaborate. At step 418, the user may share with other members, clients and external recipients. While the process of FIG. 4 illustrates certain steps performed in a particular order, it should be understood that the embodiments of the present invention may be practiced by adding one or more steps to the processes, omitting steps within the processes and/or altering the order in which one or more steps are performed. Additional details for each step are provided below.

Figure 5:
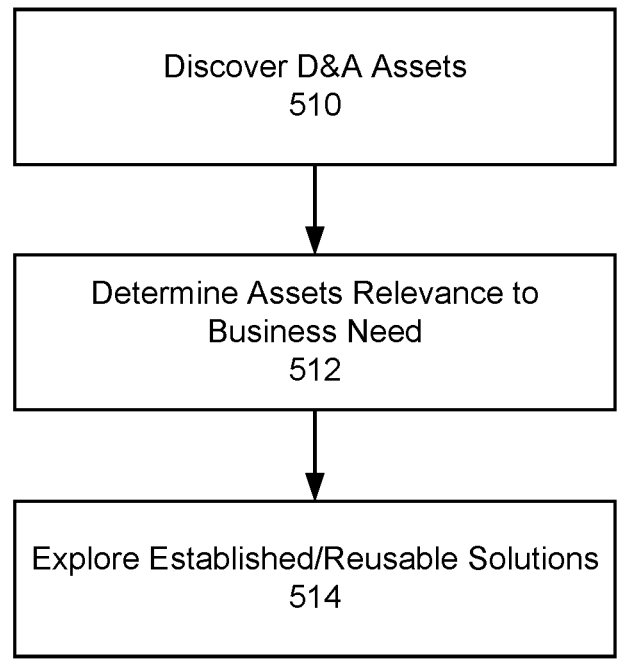
FIG. 5 is an exemplary flow diagram, according to an embodiment of the present invention.

At step 410, assets may be discovered. Users may quickly discover data and analytic assets available for use. FIG. 5 details discovery of data, assets and use cases.

Figure 6:
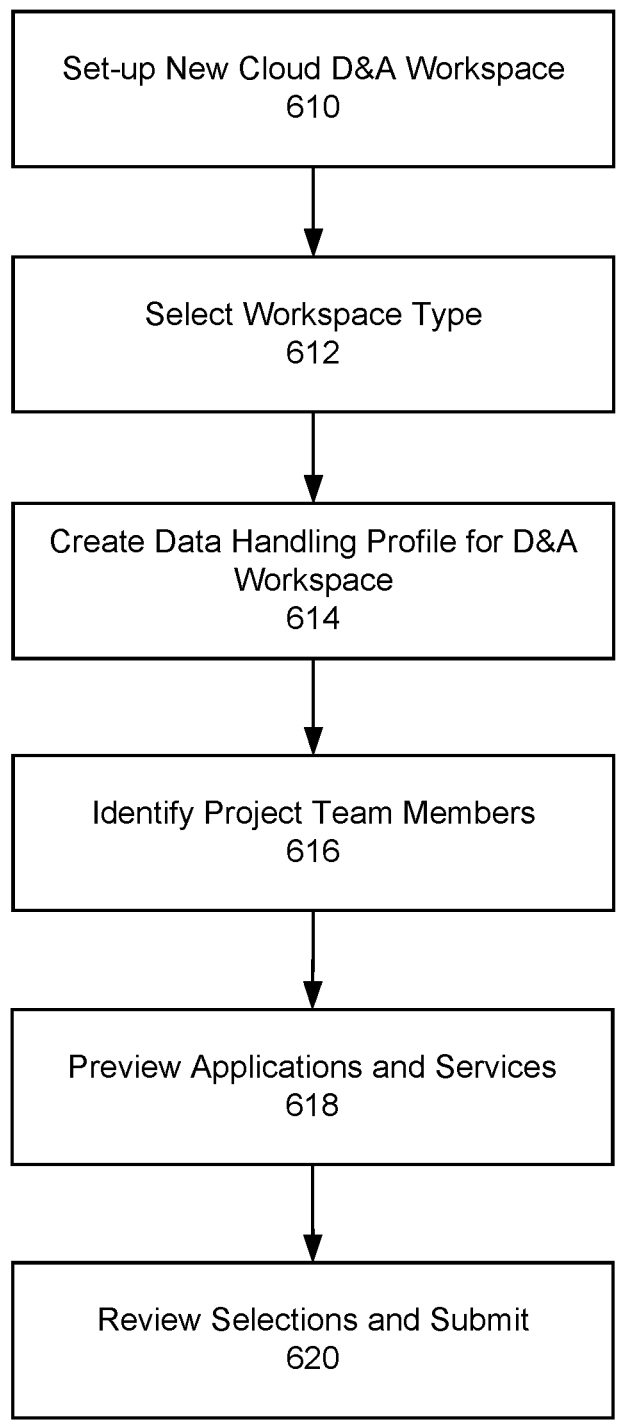
FIG. 6 is an exemplary flow diagram, according to an embodiment of the present invention.

At step 412, a workspace may be created. Users may leverage a secure cloud D&A workspace. FIG. 6 details cloud D&A workspace set-up.

Figure 7A:
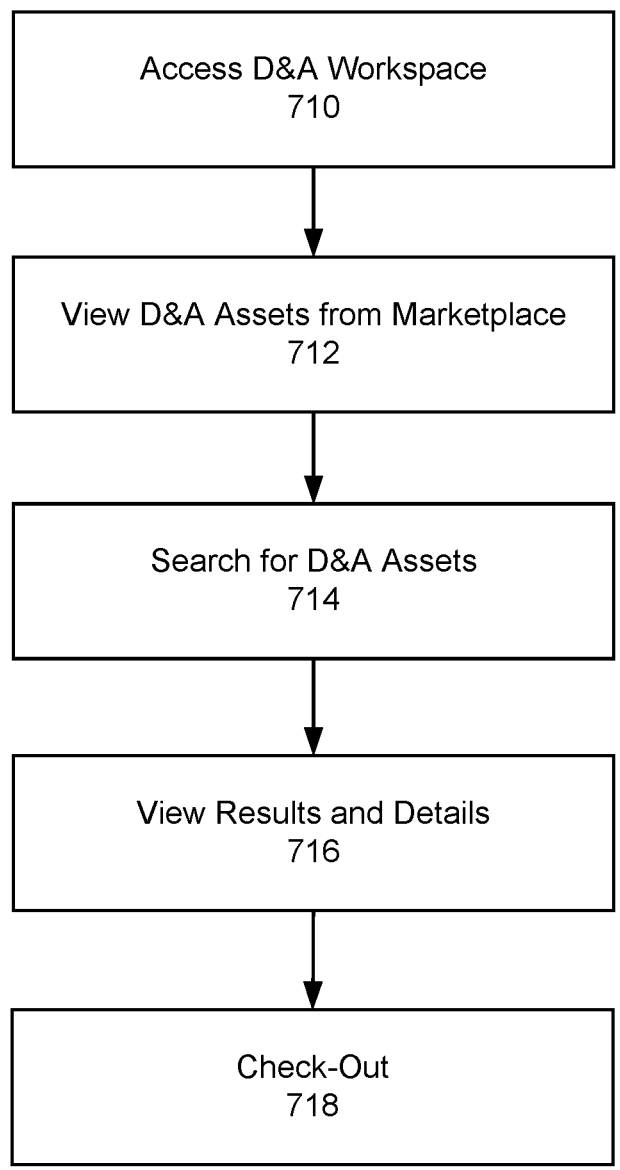
FIG. 7A is an exemplary flow diagram, according to an embodiment of the present invention.
Figure 7B:
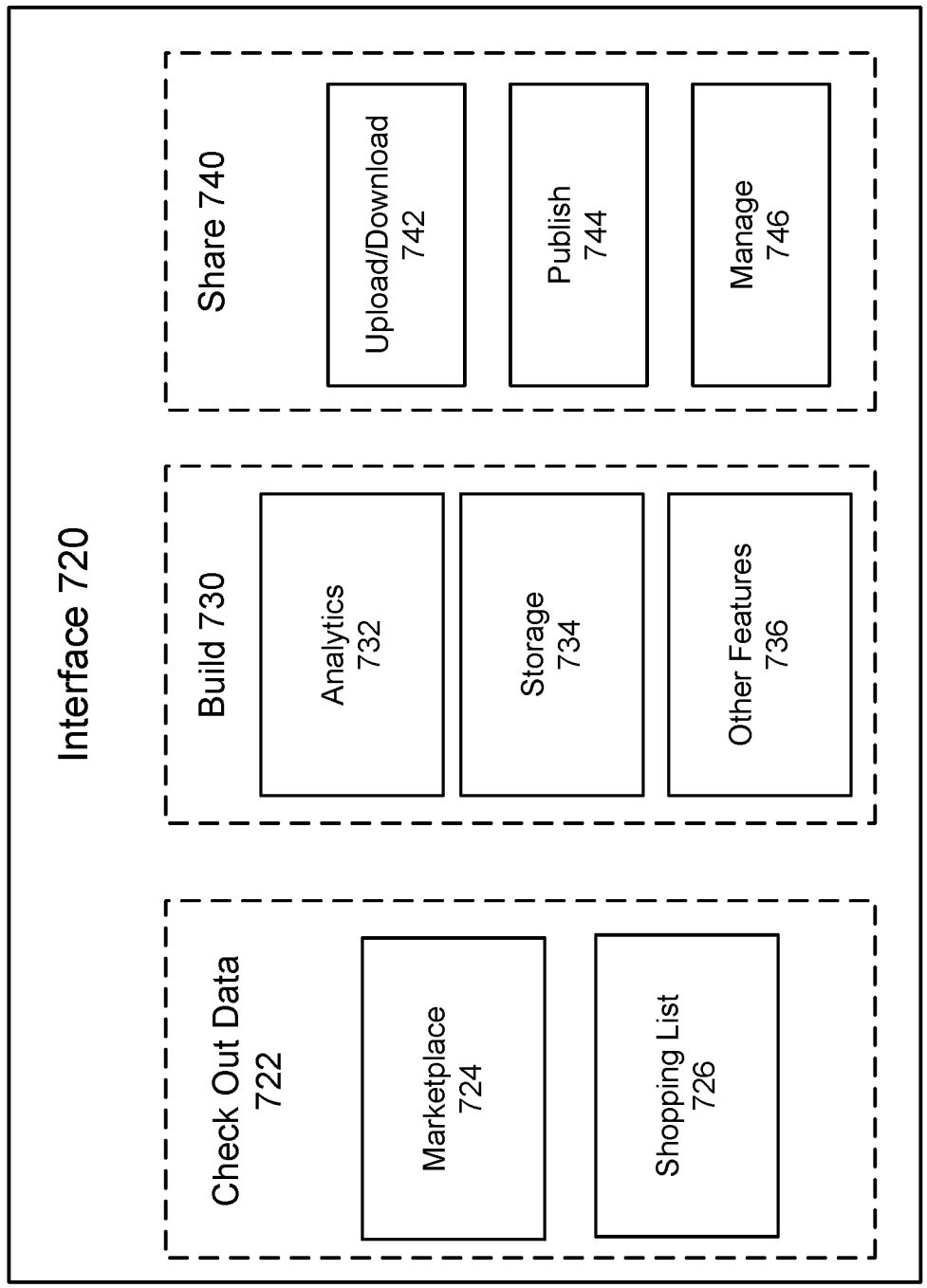
FIG. 7B is an exemplary interface, according to an embodiment of the present invention.

At step 414, assets may be checked-out. Users may find and check-out D& A assets in the data marketplace to get started. FIGS. 7A and 7B detail accessing data assets and analytic solutions.

Figure 8:
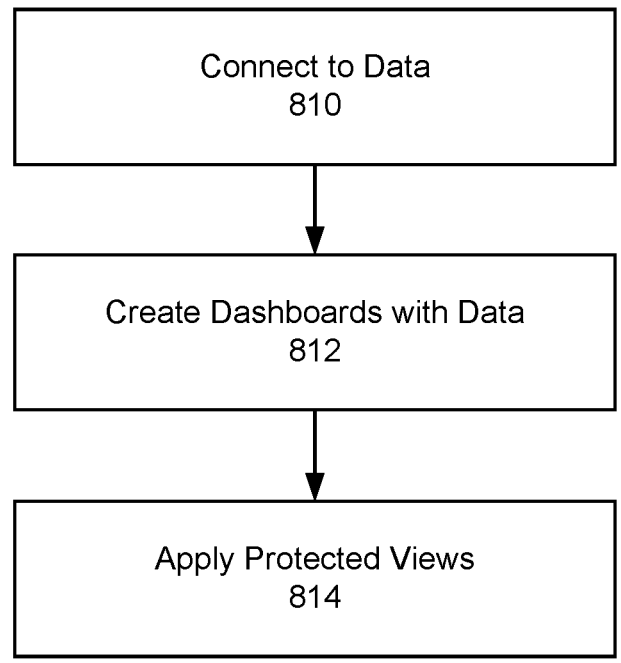
FIG. 8 is an exemplary flow diagram, according to an embodiment of the present invention.

At step 416, a user may build and collaborate. Users may leverage or build new analytics and outputs while collaborating with their teams. FIG. 8 details building and collaborating features.

Figure 9:
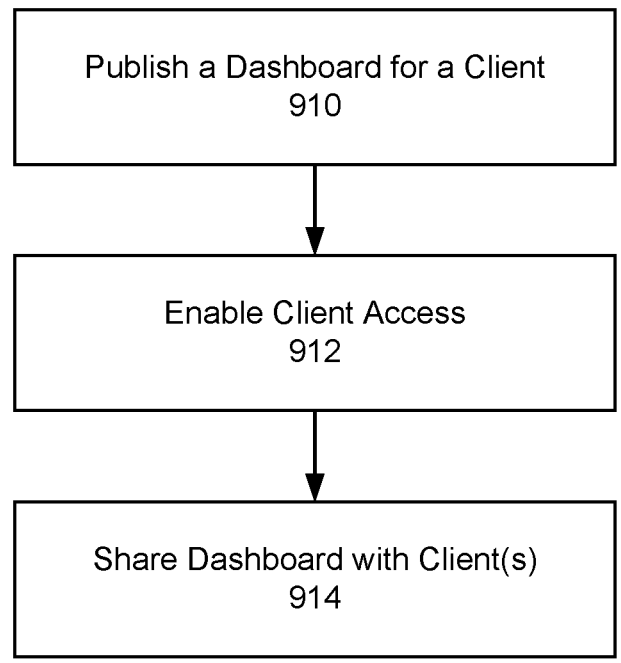
FIG. 9 is an exemplary flow diagram, according to an embodiment of the present invention.

At step 418, the user may share with other members, clients and external recipients. Users may share and deliver visualization outputs with clients, for example. FIG. 9 details sharing and delivering features.

FIG. 5 is an exemplary flow diagram, according to an embodiment of the present invention. At step 510, D&A assets may be discovered. At step 512, asset relevance to a business need may be determined. At step 514, established and/or reusable solutions may be explored. While the process of FIG. 5 illustrates certain steps performed in a particular order, it should be understood that the embodiments of the present invention may be practiced by adding one or more steps to the processes, omitting steps within the processes and/or altering the order in which one or more steps are performed. Additional details for each step are provided below.

At step 510, D&A assets may be discovered. Users may quickly find data and/or repeatable analytics to deploy. Users may perform searches by asset type, provider, industry, business need keywords (e.g., ESG, automation, supply chain, etc.). Users may explore data and solutions relevant to business problems without committing to a workspace, requirements exercise or licensing that result in cost accumulation.

At step 512, asset relevance to a business need may be determined. For example, an asset profile page may output context for the data asset, targeted at business consumption, beyond traditional metadata. In addition, if the user is evaluating data or analytic assets, the user may add this to a list for use by a team. In addition, some analytic assets (e.g., predefined benchmarking reports) may be executed quickly. Asset metadata profile may include: name, overview, domain, update frequency, time period, collection/sources, data set formats, pricing information, data handling rules, compliance information, use case trends, past applications, usage tags, coverage, etc.

At step 514, established and/or reusable solutions may be explored.

FIG. 6 is an exemplary flow diagram, according to an embodiment of the present invention. At step 610, a new cloud D&A workspace may be set-up. At step 612, a workspace type may be selected. At step 614, a data handling profile may be created for a D&A workspace. At step 616, project team members may be identified. At step 618, applications and services may be previewed. At step 620, selections may be reviewed and then submitted. While the process of FIG. 6 illustrates certain steps performed in a particular order, it should be understood that the embodiments of the present invention may be practiced by adding one or more steps to the processes, omitting steps within the processes and/or altering the order in which one or more steps are performed. Additional details for each step are provided below.

At step 610, a new cloud D&A workspace may be set-up. To check out and work with data in a permissible manner, a D&A workspace may be needed to secure access to assets and the right analytical tools. A user and team members may coverage D&A workspaces to build together, collaborate, maintain and deliver a solution. Users may have access to various applications. Every internal project, opportunity or client engagement team may need a D&A workspace. Time and resources may be conserved and efficiencies realized through self-service provisioning D&A workspaces, e.g., IT resources are not needed to create workspaces.

At step 612, a workspace type may be selected. A user may select the type of workspace based on intended use and/or other considerations. Workspace types may include client delivery D&A workspace, internal D&A workspace, personal training workspace, etc. Client delivery D&A workspace may be applicable for client engagement delivery work, including analysis of client data and development of client deliverables. Internal D&A workspace may be relevant for work internal to an entity, including demonstrations, sales support and development of data solutions. Personal training workspace may be relevant to practice data analytics skills, explore new applications and take training courses. In addition, operations/engineering teams may have permanent workspaces with extra permissions and applications. Other workspaces may be available based on applications, industries, use cases, preferences, etc.

At step 614, a data handling profile may be created for a D&A workspace. The profile may identify intended use of the workspace, data and solutions. For example, a user may provide inputs (e.g., yes/no answers to questions relating to access, use, etc.) to create a profile for the project's D&A workspace. This profile may be referenced when checking out data assets to determine permissibility of project-wide access. D&A workspace data handling profiles further support compliance with third party data contracts as well as other guidelines, etc. The profile may be based on internal and other policies, e.g., data handling, governance, etc.

At step 616, project team members may be identified. Team members may be identified through a search, internal directory, etc. Roles (as well as other information) based on involvement in the project may be identified. The team member accounts and project roles may automatically feed into applications in the D&A workspace.

At step 618, applications and services may be previewed. A user may check applications that come with the D&A workspace and turn on advanced tools based on need. Some applications may be automatically included in workspaces. More specialized applications with a limited pool of licenses may be available where opting in may be required. Other tools and features may be available.

At step 620, selections may be reviewed and then submitted. A user may interact with any step and review or modify a selection. When satisfied, the user may submit the request for workspace creation approval. An embodiment of the present invention provides a self-guided and automated set-up of a D&A workspace that streamlines the process.

FIG. 7A is an exemplary flow diagram, according to an embodiment of the present invention. At step 710, a D&A workspace may be accessed. At step 712, D&A assets may be viewed from a marketplace. At step 714, D&A assets may be searched. At step 716, results and details may be viewed. At step 718, a check out process may be performed. While the process of FIG. 7A illustrates certain steps performed in a particular order, it should be understood that the embodiments of the present invention may be practiced by adding one or more steps to the processes, omitting steps within the processes and/or altering the order in which one or more steps are performed. Additional details for each step are provided below.

At step 710, a D&A workspace may be accessed. A user may access the D&A workspace and start working with the data, as detailed below. The team members identified during the D&A workspace creation may have access to the workspace as well.

At step 712, D&A assets may be viewed from a marketplace. FIG. 7B is an exemplary interface according to an embodiment of the present invention. As shown in FIG. 7B, a user may access functions such as Check Out Data 722, Build 730 and Share 740. Check Out Data 722 may provide access to Marketplace 724, which may include Data Catalog, Search and Views, and a Shopping List interface 726. Build may include Analytics 732, Storage 734 and Other Features represented by 736. Share 740 may include Upload/Download 742, Publish 744, and Manage 746. Data Catalog may store and manage data assets and function as a single source of truth. Users may access views into recently added data collections or drill into categories of data assets. Users may also search for D&A assets to check out to a project's D&A workspace.

Marketplace 724 may also provide lineage tracking, data structure, classifications, usage metrics and other features. In addition, Marketplace 724 may include an AI-based recommendation engine that identifies recent additions, data related to other searches, frequently used data assets, etc.

At step 714, D&A assets may be searched. An embodiment of the present invention may support various types of search tools, keyword, dropdown filters, etc.

At step 716, results and details may be viewed. For example, users may interact with D&A assets to view detailed profile data and investigate further. Users may conduct deep dive profiling and assessment prior to checkout. Other functions may include investigating schema information, preview data and access scores, e.g., Data Quality Scores. Data quality scores may be continually updated as data is refreshed which provides transparency and confidence. In addition, terms of use provide clear upfront data handling guidance based on contract language and policy guidelines and considerations.

For example, a user may interact with a sample of the data set itself. Based on a user profile (which may be established at workspace creation), sensitive data may be masked, tokenized, hidden completely and/or otherwise protected. This may be driven by virtualization and protection capabilities and further based on data handling policy-as-code.

At step 718, a check out process may be performed. At check out, users may review data asset's terms of use and cost (if applicable) before confirming. The asset may then be submitted for approval (e.g., Project Leader approval, etc.). The D&A workspace's data handling profile may be validated against the data asset's terms of use before data is accessible. Permissibility checks may run throughout the process. In addition, communications (e.g., notifications, etc.) may be generated for approvals and/or to communicate availability of the data.

FIG. 8 is an exemplary flow diagram, according to an embodiment of the present invention. At step 810, a user may connect to data. At step 812, dashboards may be created. At step 814, protected views may be applied. While the process of FIG. 8 illustrates certain steps performed in a particular order, it should be understood that the embodiments of the present invention may be practiced by adding one or more steps to the processes, omitting steps within the processes and/or altering the order in which one or more steps are performed. Additional details for each step are provided below.

At step 810, a user may connect to data. Once data access has been provisioned, a user may start using the data with the tools and services in a D&A workspace. The D&A workspace may leverage data asset storage that scales to meet the compute need, supporting business intelligence and demanding ML/AI modeling.

When connected to the marketplace, checked-out data assets may be accessible for use. Based on a project role and user attributes, some data may be hidden, masked, anonymized, tokenized or otherwise protected. This feature may be based on data protection policies that may be enforced by data virtualization tools and data protection services. These tools protect against unauthorized access and use of assets and further support compliance with contractual and regulatory requirements.

At step 812, dashboards and/or business intelligence reports may be created. This may include various outputs, visualizations, interactive panels, etc.

At step 814, protected views may be applied. While working with data, policy-as-code may be dynamically applied even when viewing through a visualization. Varying levels of confidential information may be accessed by those with authorization. For external users (e.g., contractors), sensitive data may be masked or otherwise protected/hidden. Data may be dynamically hidden or removed based on the workspace and user profile, not only visually but also from calculations and transformations as well.

In addition, users may bring permissible client data into the environment to blend with third party or internal data to create more proprietary insights.

According to another example, an internal employee may be cleared to see data in its entirety, including PII (e.g., email addresses, full names of credit card holders, social security numbers, etc.). Another user, such as a business analyst, may see data for some companies where PII data is hidden and social security numbers are anonymized.

FIG. 9 is an exemplary flow diagram, according to an embodiment of the present invention. At step 910, a dashboard for a client may be published. At step 912, client access may be enabled. At step 914, dashboards may be shared. While the process of FIG. 9 illustrates certain steps performed in a particular order, it should be understood that the embodiments of the present invention may be practiced by adding one or more steps to the processes, omitting steps within the processes and/or altering the order in which one or more steps are performed. Additional details for each step are provided below.

At step 910, a dashboard for a client or consumer may be published. For example, a project team may upload a file with benchmarking information to a secure publishing service. According to an illustrative use case, the team may make the dashboard available to specific recipients (e.g., clients, teams, individual recipients, etc.) with viewership access. The integrated platform maintains data in the dashboards and analytics up-to-date based on preference. This allows for the use and re-use of dashboards to support client insights related to a key area of focus (e.g., sales, risk management, etc.). Other variations to meet business needs and objectives may be supported.

At step 912, client access may be enabled. Clients may receive a communication, e.g. email, notification, when the dashboard is ready and shared.

At step 914, dashboards may be shared. Clients may access the dashboards for review and insights. Data may be continually protected, masking and hiding what should not be seen by a client audience. Clients may only view the data appropriate for them, based on the handling policy and rules established.

Figure 10:
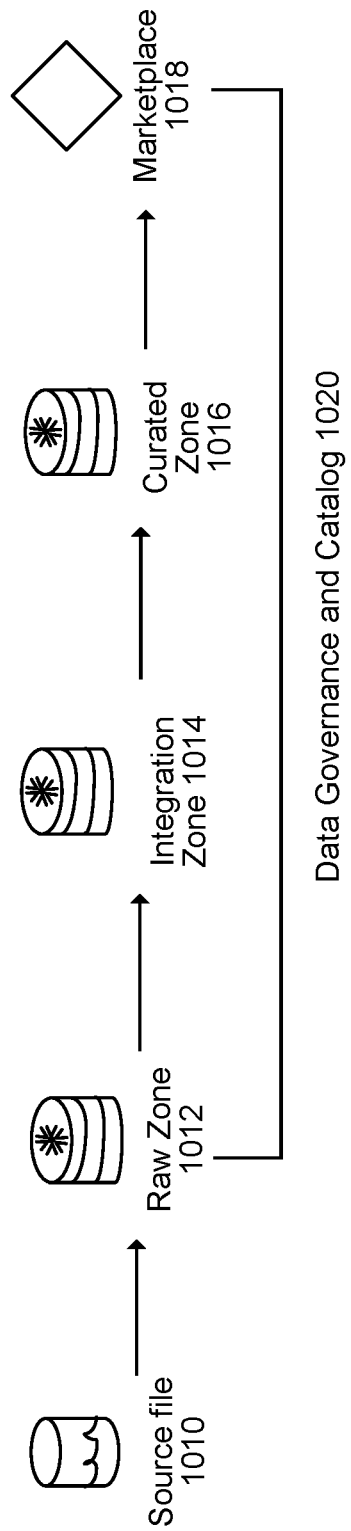
FIG. 10 is a data operations data flow, according to an embodiment of the present invention.

FIG. 10 is a data operations data flow, according to an embodiment of the present invention. FIG. 10 illustrates Source File 1010, Raw Zone 1012, Integration Zone 1014, Curated Zone 1016, Marketplace 1018 and Data Governance and Catalog 1020.

Source File 1010 may be stored in a Data Lake or other cloud-based repository for structured and unstructured data. Data Integration may be applied to ingest the data and load/map the data into a Raw Zone 1012. During the ingestion process, modules may be utilized to protect sensitive data. For example, data may be masked, encrypted, anonymized, tokenized and/or otherwise protected. Data structures in the raw zone may be matched to source to account for schema drift.

Data Quality may be applied to improve and cleanse the dataset where custom rules may be executed to prepare the dataset for consumption. For example, data quality and transformation rules may be applied. As data is moved from Raw Zone 1012 to Integration Zone 1014, the data may undergo transformation, organization and/or enrichment to provide a more useful dataset fit for business consumption and analysis.

The Curated Zone 1016 may be properly modeled for end user consumption. A virtualization layer may also be configured to surface the data from Curated Zone 1016. For example, tables/views may be created for end user consumption. An embodiment of the present invention may provide a single view of data without data movement with a result of reducing system workload. In addition, centralized access allows for querying across data sources from a common data access point.

The dataset and the data asset profile may be published to the Marketplace 1018 and made available for users. Marketplace 1018 may be integrated with a data governance and catalog tool. Users may view asset profiles, data quality scores and metrics, data lineage as well as a data dictionary.

As shown by 1020, metadata catalogs, data lineage and/or data governance policies may be synchronized and managed throughout the end to end pipeline within the data governance and catalog tool.

An embodiment of the present invention may support various other features and functions. For example, a user may view multiple workspaces and corresponding status, e.g., active, inactive, provisioning, etc. Workspace details may include: client name, project name, workspace type (e.g., client delivery, internal project, etc.), engagement code, date created, status, etc.

Figure 11:
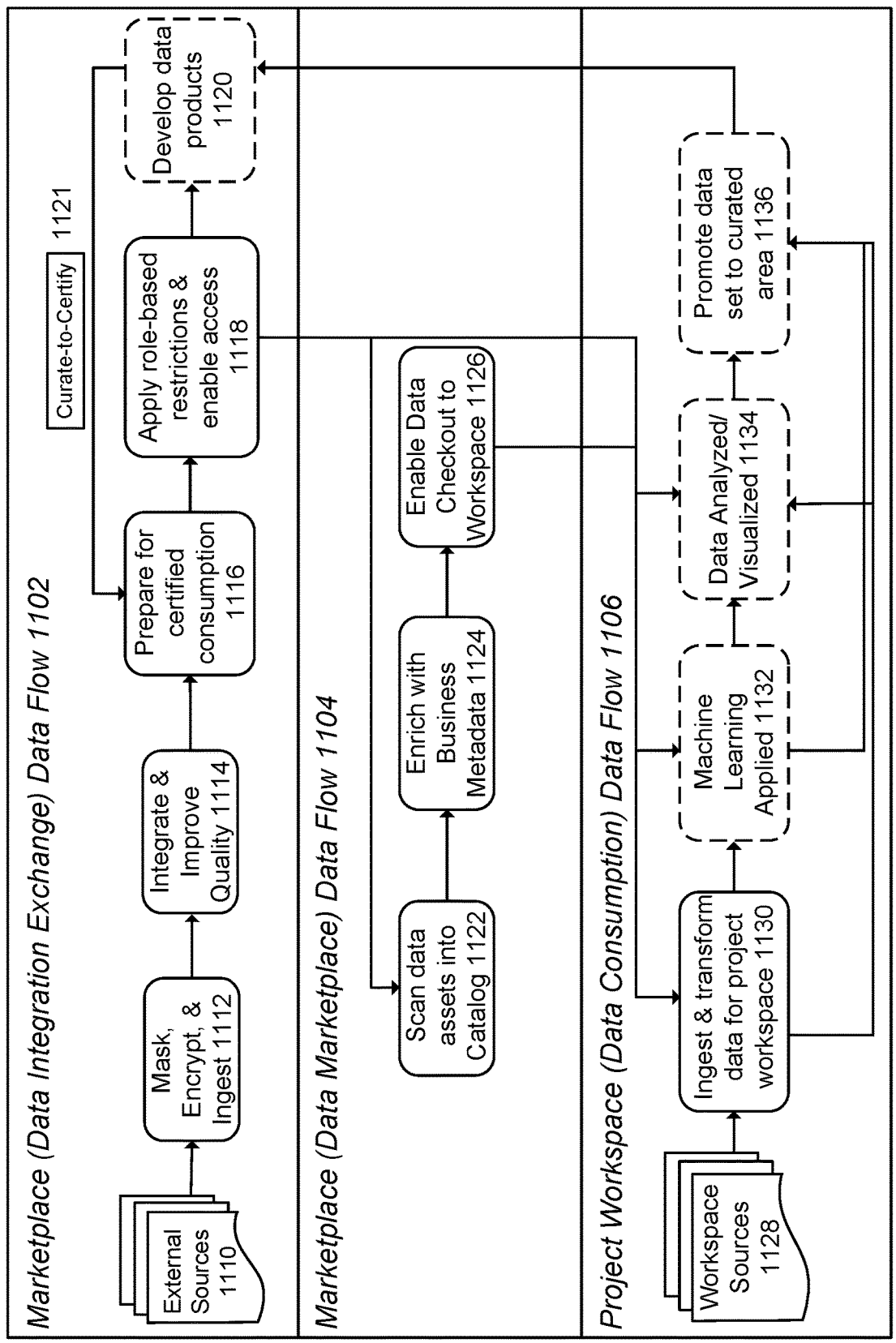
FIG. 11 is an exemplary dataflow, according to an embodiment of the present invention.

FIG. 11 is an exemplary dataflow, according to an embodiment of the present invention. FIG. 11 demonstrates Marketplace (Data Integration Exchange) Data Flow 1102, Data Marketplace Data Flow 1104 and Project Workspace (Data Consumption) Data Flow 1106.

As shown by 1110, data from external sources may be received. The received data may be masked, encrypted and ingested at 1112. Data may be integrated and quality improvement may be applied, at 1114. Data may be prepared for certified consumption, at 1116. At 1118, role-based or attribute-based restrictions may be applied and access may be enabled. At 1120, data products may be developed. A curate-to-certify process may be applied, as shown by 1121, which may include a validation of the data with specific data quality rules to verify the data is of an acceptable level of quality, including completeness, accuracy, and/or validity for use and/or reuse.

Data assets may be scanned into a catalog at 1122. The data may be enriched with business metadata, at 1124. Data check out may be enabled at workspace, as shown by 1126.

Workspace sources may be identified at 1128. Data may be ingested and transformed for project workspaces at 1130. Machine learning may be applied at 1132. Data may be analyzed and visualized at 1134. Data sets may be promoted to a curated area at 1136.

While the process of FIG. 11 illustrates certain steps performed in a particular order, it should be understood that the embodiments of the present invention may be practiced by adding one or more steps to the processes, omitting steps within the processes and/or altering the order in which one or more steps are performed. For example, one or more steps 1120, 1132, 1134 and 1136, as shown by dash lines, may be optional.

It will be appreciated by those persons skilled in the art that the various embodiments described herein are capable of broad utility and application. Accordingly, while the various embodiments are described herein in detail in relation to the exemplary embodiments, it is to be understood that this disclosure is illustrative and exemplary of the various embodiments and is made to provide an enabling disclosure. Accordingly, the disclosure is not intended to be construed to limit the embodiments or otherwise to exclude any other such embodiments, adaptations, variations, modifications and equivalent arrangements.

The foregoing descriptions provide examples of different configurations and features of embodiments of the invention. While certain nomenclature and types of applications/hardware are described, other names and application/hardware usage is possible and the nomenclature is provided by way of non-limiting examples only. Further, while particular embodiments are described, it should be appreciated that the features and functions of each embodiment may be combined in any combination as is within the capability of one skilled in the art. The figures provide additional exemplary details regarding the various embodiments.

Various exemplary methods are provided by way of example herein. The methods described can be executed or otherwise performed by one or a combination of various systems and modules.

The use of the term computer system in the present disclosure can relate to a single computer or multiple computers. In various embodiments, the multiple computers can be networked. The networking can be any type of network, including, but not limited to, wired and wireless networks, a local-area network, a wide-area network, and the Internet.

According to exemplary embodiments, the System software may be implemented as one or more computer program products, for example, one or more modules of computer program instructions encoded on a computer-readable medium for execution by, or to control the operation of, data processing apparatus. The implementations can include single or distributed processing of algorithms. The computer-readable medium can be a machine-readable storage device, a machine-readable storage substrate, a memory device, or a combination of one or more them. The term "processor" encompasses all apparatus, devices, and machines for processing data, including by way of example a programmable processor, a computer, or multiple processors or computers. The apparatus can include, in addition to hardware, software code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communications network.

A computer may encompass all apparatus, devices, and machines for processing data, including by way of example a programmable processor, a computer, or multiple processors or computers. It can include, in addition to hardware, code that creates an execution environment for the computer program in question, e.g., code that constitutes processor firmware, a protocol stack, a database management system, an operating system, or a combination of one or more of them.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computer-readable media suitable for storing computer program instructions and data can include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While the embodiments have been particularly shown and described within the framework for conducting analysis, it will be appreciated that variations and modifications may be affected by a person skilled in the art without departing from the scope of the various embodiments. Furthermore, one skilled in the art will recognize that such processes and systems do not need to be restricted to the specific embodiments described herein. Other embodiments, combinations of the present embodiments, and uses and advantages of the will be apparent to those skilled in the art from consideration of the specification and practice of the embodiments disclosed herein. The specification and examples should be considered exemplary.

What is claimed is:

1. A computer-implemented system for providing a data asset marketplace platform, the system comprising:
   a data exchange interface that is configured to receive data assets from a plurality of data sources, wherein the plurality of data sources comprise at least one external source and at least one third party source;
   a data asset storage component that stores and manages the data assets and one or more data analytics; and
   a data asset marketplace that comprises a user interface that enables a user identified by a persona profile to access the data asset marketplace, wherein the data asset marketplace comprises a computer processor coupled to the user interface and the data asset storage component and the computer processor is configured to perform the steps of:
      enabling the user to discover and select data assets and analytics available through the data asset marketplace via a data virtualization layer;
      setting up a cloud data and analytics workspace for a specific project wherein the cloud data and analytics workspace comprises a data handling profile and one or more designated team members;
      enabling the user to check-out the selected data assets and analytics;
      enabling the user to build through the cloud data and analytics workspace to generate an output;
      based on one or more data protection policies, identifying whether the output comprises sensitive data;
      when sensitive data is detected, applying protected views to the sensitive data; and
      enabling the user to share and deliver the output with the one or more protected views to one or more recipients.

2. The system of claim 1, wherein the data exchange interface comprises a raw zone, integration zone and curated zone, wherein the raw zone receives raw data; the integration zone transforms the raw data and the curated zone provides the transformed data for end user consumption.

3. The system of claim 1, wherein the user is defined by a persona profile, wherein the persona profile comprises a consumer, a user and a coder.

4. The system of claim 1, wherein the plurality of data sources comprises one or more of: market data services, consolidated data sources, subscription data and research data.

5. The system of claim 1, wherein the data asset marketplace provides centralized data asset management, storage and maintenance as a single source of truth.

6. The system of claim 1, wherein the sensitive data is protected through one or more of: masking, encryption, tokenization and anonymizing data.

7. The system of claim 1, wherein the data virtualization layer provides an interface to data across the plurality of data sources and renders data from the plurality of data sources into a single workspace.

8. The system of claim 1, wherein the data virtualization layer provides a centralized and consistent enforcement of data access and governance polices across the plurality of data sources.

9. The system of claim 1, wherein the data handling profile identifies intended use of the cloud data and analytics workspace, data and solutions.

10. The system of claim 1, wherein the data asset marketplace is coupled to a data catalog that stores and manages data assets and functions as a single source of truth.

11. A computer-implemented method for providing a data asset marketplace platform, the method comprising the steps of:
   receiving, via a data exchange interface, data assets from a plurality of data sources, wherein the plurality of data sources comprise at least one external source and at least one third party source;
   storing and managing, via a data asset storage component, the data assets and one or more data analytics;
   enabling, via a user interface, a user to discover and select data assets and analytics available through the data asset marketplace via a data virtualization layer, wherein the user is identified by a persona profile;
   setting up a cloud data and analytics workspace for a specific project wherein the cloud data and analytics workspace comprises a data handling profile and one or more designated team members;
   enabling the user to check-out the selected data assets and analytics;
   enabling the user to build through the cloud data and analytics workspace to generate an output;
   based on one or more data protection policies, identifying whether the output comprises sensitive data;
   when sensitive data is detected, applying protected views to the sensitive data; and
   enabling the user to share and deliver the output with the one or more protected views to one or more recipients.

12. The method of claim 11, wherein the data exchange interface comprises a raw zone, integration zone and curated zone, wherein the raw zone receives raw data; the integration zone transforms the raw data and the curated zone provides the transformed data for end user consumption.

13. The method of claim 11, wherein the user is defined by a persona profile, wherein the persona profile comprises a consumer, a user and a coder.

14. The method of claim 11, wherein the plurality of data sources comprises one or more of: market data services, consolidated data sources, subscription data and research data.

15. The method of claim 11, wherein the data asset marketplace provides centralized data asset management, storage and maintenance as a single source of truth.

16. The method of claim 11, wherein the sensitive data is protected through one or more of: masking, encryption, tokenization and anonymizing data.

17. The method of claim 11, wherein the data virtualization layer provides an interface to data across the plurality of data sources and renders data from the plurality of data sources into a single workspace.

18. The method of claim 11, wherein the data virtualization layer provides a centralized and consistent enforcement of data access and governance polices across the plurality of data sources.

19. The method of claim 11, wherein the data handling profile identifies intended use of the cloud data and analytics workspace, data and solutions.

20. The method of claim 11, wherein the data asset marketplace is coupled to a data catalog that stores and manages data assets and functions as a single source of truth.

\* \* \* \* \*